US007216089B1

(12) United States Patent
Ota et al.

(10) Patent No.: US 7,216,089 B1
(45) Date of Patent: May 8, 2007

(54) PROMOTION METHOD AND SYSTEM

(75) Inventors: Michihiro Ota, Sakado (JP); Hiroaki Yoshida, Tsurugashima (JP); Hiroaki Shinoda, Tsurugashima (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 365 days.

(21) Appl. No.: 09/672,476

(22) Filed: Sep. 28, 2000

(30) Foreign Application Priority Data

Sep. 30, 1999 (JP) ............................... 11-280034
Jul. 11, 2000 (JP) ............................... 2000-210217

(51) Int. Cl.
*G06Q 30/00* (2006.01)

(52) U.S. Cl. ...................................................... 705/14
(58) Field of Classification Search ................ 705/1, 705/14, 16, 26, 37, 500, 39, 44; 700/231–238, 700/242
See application file for complete search history.

(56) References Cited

U.S. PATENT DOCUMENTS

| 4,636,963 | A | * | 1/1987 | Nakajima et al. | 700/238 |
| 5,219,059 | A | * | 6/1993 | Furuya et al. | 194/200 |
| 5,249,044 | A | * | 9/1993 | Von Kohorn | 705/14 |
| 5,717,866 | A | * | 2/1998 | Naftzger | 705/16 |
| 5,901,246 | A | * | 5/1999 | Hoffberg et al. | 382/289 |
| 5,933,813 | A | * | 8/1999 | Teicher et al. | 705/26 |
| 5,937,391 | A | * | 8/1999 | Ikeda et al. | 705/14 |
| 5,991,749 | A | * | 11/1999 | Morrill, Jr. | 705/44 |
| 6,015,344 | A | * | 1/2000 | Kelly et al. | 463/16 |
| 6,042,149 | A | * | 3/2000 | Roshkoff | 283/67 |
| 6,068,183 | A | * | 5/2000 | Freeman et al. | 705/26 |
| 6,075,971 | A | * | 6/2000 | Williams et al. | 705/14 |
| 6,084,528 | A | * | 7/2000 | Beach et al. | 340/5.9 |
| 6,185,545 | B1 | * | 2/2001 | Resnick et al. | 705/40 |
| 6,202,056 | B1 | * | 3/2001 | Nuttall | 705/52 |
| 6,292,786 | B1 | * | 9/2001 | Deaton et al. | 705/14 |
| 6,405,174 | B1 | * | 6/2002 | Walker et al. | 705/14 |
| 6,424,884 | B1 | * | 7/2002 | Brooke et al. | 700/232 |
| 6,513,015 | B2 | * | 1/2003 | Ogasawara | 705/26 |
| 6,575,362 | B1 | * | 6/2003 | Bator et al. | 235/381 |
| 6,598,024 | B1 | * | 7/2003 | Walker et al. | 705/16 |
| 6,643,623 | B1 | * | 11/2003 | Kolls | 705/14 |
| 6,963,589 | B1 | * | 11/2005 | Sugata et al. | 370/535 |
| 7,027,890 | B2 | * | 4/2006 | Wilson | 700/232 |

FOREIGN PATENT DOCUMENTS

| JP | 06-096096 | 4/1994 |
| JP | 07/065244 | 3/1995 |

(Continued)

OTHER PUBLICATIONS

Betz, Karl ST 98-0343-GIL Nov. 9, 1998 VENDORS.*

*Primary Examiner*—Igor N. Borissov
(74) *Attorney, Agent, or Firm*—Welsh & Katz, Ltd.

(57) ABSTRACT

Upon the sale of merchandise by a vending machine, encrypted point information expressing prescribed points is presented to a user. The user transmits the presented point information, together with identification information for the user, to a center device by means of the user's portable telephone set. The center device decrypts the transmitted and encrypted point information, stores and manages points corresponding to the point information for the user, and offers prescribed service to the user based on the points stored and managed for the user.

22 Claims, 16 Drawing Sheets

FOREIGN PATENT DOCUMENTS

| | | | |
|---|---|---|---|
| JP | 08/087655 | | 4/1996 |
| JP | 08153248 A | * | 6/1996 |
| JP | 08249530 | * | 9/1996 |
| JP | 09079161 | | 3/1997 |
| JP | 09184243 | | 7/1997 |
| JP | 03/319970 | | 12/1997 |
| JP | 10017924 | | 1/1998 |
| JP | 11-025328 | | 1/1999 |

* cited by examiner

PROMOTION METHOD AND SYSTEM

BACKGROUND OF THE INVENTION

1. Field of the Invention

This invention concerns a promotion method and system for promoting sales of merchandise by issuing points upon sale of merchandise.

2. Description of the Related Art

Conventionally in promotions of specific merchandise, often points are issued upon each merchandise sale, and the purchaser of the above merchandise collects points and exchanges them for a prize or other reward.

Here the issuing of points may be performed by stamping or magnetically recording cards possessed by each purchaser, or by affixing seals to the merchandise, with purchasers collecting these seals.

However, when using cards, the cards must be manufactured and distributed in advance, and when affixing seals to merchandise, seals must be affixed to all the merchandise for which points are to be awarded, demanding considerable cost and labor from the vendor.

Further, if cards are used the purchaser must carry a card, and if seals are used the purchaser must collect seals and affix them to a base and manage them.

Particularly when collecting seals affixed to merchandise which is not always brought home, such as beverages purchased from vending machines, either the seals alone must be brought home, or the base for mounting seals must always be carried on one's person. And in order to receive a service for points, a card or a base with seals affixed must be mailed to the vendor or similar action taken, requiring substantial time and cost.

As described above, when issuing points by affixing seals to merchandise, substantial labor is demanded of both the vendor and the purchaser for processing of points. When adding points for cards possessed by purchasers, it is difficult for vending machines to issue points, and it is also difficult to accommodate nation-wide promotions sponsored by the manufacturer of the above merchandise.

In either of these cases, considerable labor is required of the promotion sponsor for the recovery and totaling of points.

SUMMARY OF THE INVENTION

The object of this invention is to provide a promotion method and system which facilitate the issuing, collection, recovery, and totaling of points.

In order to achieve the above object, the promotion method of this invention is a promotion method, in which merchandise sales are promoted by issuing points upon sale of merchandise; wherein point information related to prescribed points is presented to a user at a time of merchandise sales; said user transmits to a center device said presented point information, together with identification information for said user; said center device stores and manages points corresponding to said transmitted point information for said user; and, a prescribed service is offered to said user based on the points stored and managed in correspondence to said user.

Here the presentation of the above point information can be performed by a point issuing device provided in the equipment performing sales of the merchandise. The point information comprises a module code related to the point issuing device and a secret code related to the points; among the module code and the secret code, at least the secret code may be presented to the user in a encrypted form.

The presentation of the point information may be performed by attaching in advance a printed matter, on which is printed in advance the point information, to the merchandise.

The presentation of the point information by this point issuing device is performed by displaying the point information on a display unit of the point issuing device, or by printing out the point information on a prescribed form output from the point issuing device.

The presentation of the point information can also be performed by inputting the point information to a communication equipment of the user, by means of communication between the point issuing device and the communication equipment.

The communication equipment comprises a portable telephone set carried by the user, and input of the point information to the communication equipment can be performed using wire communication, wireless communication, infrared communication, or audio communication between the point issuing device and the portable telephone set.

The center device comprises a user database to store and manage a state of use of the system by the user, corresponding to identification information of the user transmitted by the user.

The center device comprises accessing means to enable the user to access the point information which is stored and managed for the user through requests from the user.

The secret code comprises at least a point issue number. The center device decides whether the point information has been used more than once based on the point issue number.

The module code comprises code information to identify the point issuing device, and based on the module code, the center device manages a state of at least one of the point issuing device and the equipment selling the merchandise in which the point issuing device is provided.

The point information comprises at least a module code to identify the point issuing device, and based on the module code contained in the point information, the center device manages a state of the equipment selling the merchandise and in which the point issuing device is provided.

The presentation of the point information can be performed by attaching in advance a printed matter, on which is printed in advance the point information, to the merchandise. On this printed matter are printed the points and point information related to the points.

The point information is selectively concealed by a removable concealing member, such that the user obtains the above printed matter when purchasing the above merchandise, and either collects and mails to the center device the printed matter without removing the above concealment member from the printed matter, or else transmits to the center device the point information obtained from the printed matter by removing the concealment member from the printed matter, and the center device adds points based either on the points printed on printed matter which has been mailed without removing the above concealment member, or on the above point information, and provides prescribed services to the above user based on the points added in this way.

The above printed matter is for example seal-type printed matter, and the above concealment member is for example scratch-off ink.

The above center device decides whether points have been used more than once based on whether the above concealment member has been removed from the above mailed printed matter.

The above center device manages the user based on identification information for the user transmitted by the user.

The center device permits reading of point information which is stored and managed for a user in response to a request from the user.

The promotion system of this invention is a promotion system for the promotion of sales of merchandise through the issue of points upon the sale of merchandise, comprising point issuing means, provided in an equipment for sale of the merchandise, which presents to a user of the system point information showing prescribed points upon purchase of merchandise; a center device which stores and manages, for the user, points corresponding to the point information presented by the point issuing means; communication means which transmits to the center device the point information presented by the point issuing means, together with identification information for the user; update means, provided in the center device, which decodes the point information transmitted from the communication means and updates the points stored and managed for the user with the points corresponding to the point information; and service providing means, which provides to the user a prescribed service based on the points stored and managed for the user.

The point information comprises a module code which identifies the point issuing means and a secret code related to the points, and among the module code and the secret code, the point issuing means encrypts at least the secret code before presenting to the user.

The point issuing means provides to the user the point information by displaying the point information on a display unit provided in the point issuing means.

The point issuing means provides to the user the point information by printing and outputting the point information on a prescribed form, using printing means provided in the point issuing means.

The point issuing means comprises input means for input, to the communication means, of the point information through communication between the point issuing means and the communication means.

The communication means comprises a portable telephone set carried by the user, and the input means uses either wire communication, wireless communication, infrared communication, or audio communication for input of the point information.

The secret code comprises, at least, a point issue number, and the center device decides duplicate use of the point information based on the point issue number comprised in the point information.

The center device is provided with an equipment database to store and manage a state of at least one of the point issuing means and the equipment selling the merchandise in which the point issuing means is provided, in correspondence with the module code.

DESCRIPTION OF THE PREFERRED EMBODIMENTS

Figure 1:
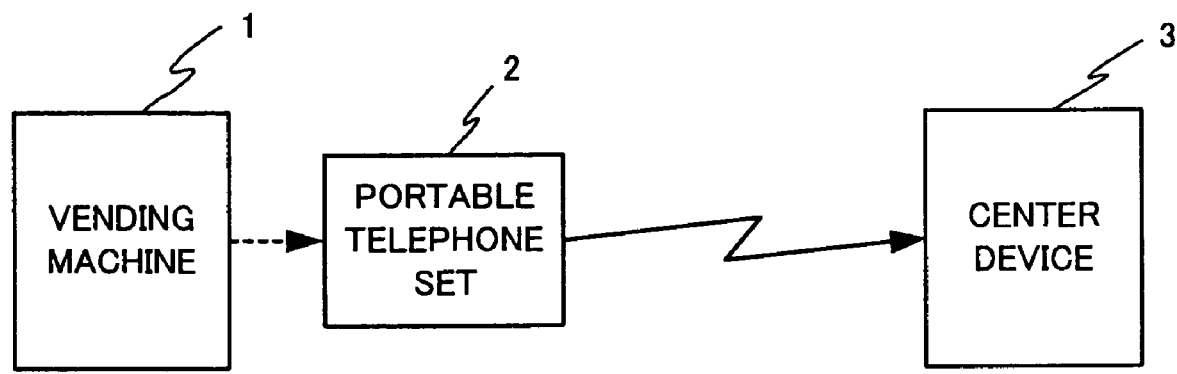
FIG. 1 is a block diagram showing in summary the configuration of a promotion system in which this invention is applied to a vending machine.

Below, embodiments of the promotion method and system of this invention are explained in detail, referring to the drawings.

FIG. 1 is a block diagram showing in summary the configuration of a promotion system in which this invention is applied to a vending machine.

In FIG. 1, the promotion system comprises a vending machine 1 which sells merchandise and issues points, a portable telephone set 2, and a center device 3 which manages points.

The vending machine 1 issues point information according to the type and number of merchandise items sold. The purchaser uses a portable telephone set 2, possessed by the purchaser, to transmit to the center device 3 the point information issued.

At the center device 3, after confirming the authenticity of the point information received, the point information is added and managed.

A detailed explanation is given below, but transmission of point information need not necessarily be performed using a portable telephone set 2; transmission from an ordinary telephone set, or from a computer or other device connected to the Internet or similar, is also possible.

First, the configuration of the vending machine 1 shown in FIG. 1 is explained.

Figure 2:
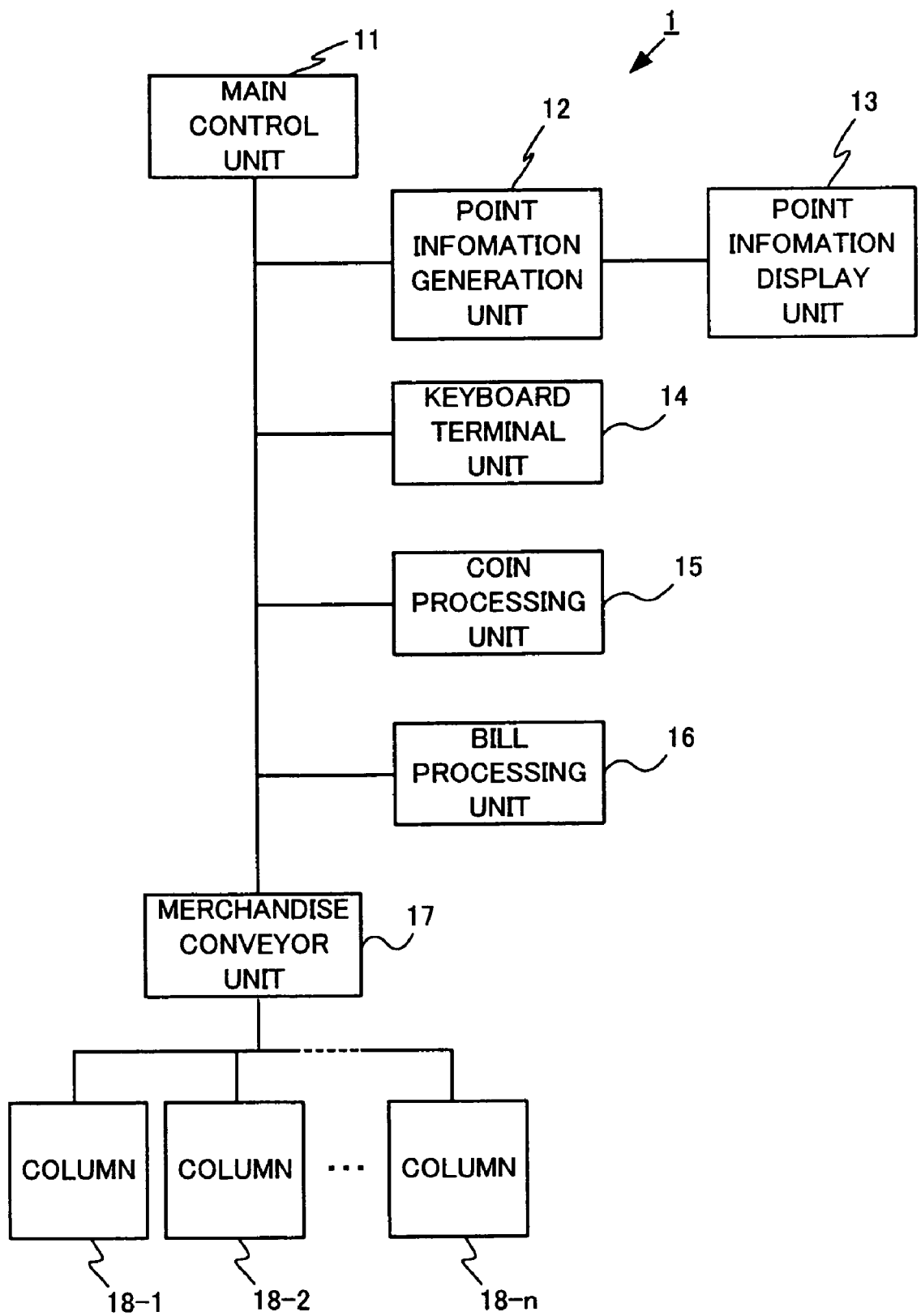
FIG. 2 is a block diagram of the configuration of a vending machine according to a first embodiment of this invention.

FIG. 2 is a block diagram of the configuration of the vending machine shown in FIG. 1.

As shown in FIG. 2, the vending machine 1 comprises a main control unit 11, point information generation unit 12, point information display unit 13, keyboard terminal unit 14, coin processing unit 15, bill processing unit 16, merchandise conveyor unit 17, and columns 18 (from 18-1 to 18-n).

The main control unit 11 controls each of the units, and controls the sale of merchandise and issuing of points. The point information generation unit 12 generates point information based on control signals from the main control unit 11, and the point information generated by this point information generation unit 12 is displayed by the point information display unit 13 as visible information (such as character strings).

The keyboard terminal unit 14 sets various values, such as price, for the merchandise to be sold. The coin processing unit 15 receives coins corresponding to the merchandise price and returns change; the bill processing unit 16 receives paper money and performs related processing. The merchandise conveyor unit 17 dispenses merchandise based on control signals from the main control unit 11, to control dispensation of merchandise stored in the columns 18. The columns 18 store various merchandise items.

Here point issue processing within the vending machine 1 is explained.

In point issuing, point information is generated by the point information generation unit 12 based on control signals from the main control unit 11, and this point information is displayed on the point information display unit 13.

The main control unit 11 sends a point generation instruction to the point information generation unit 12 when a merchandise purchase occurs; this instruction can be set to be performed depending on the column 18, that is, depending on the type of merchandise sold.

The main control unit 11 may be set such that, when a plurality of merchandises are purchased, the main control unit 11 sends instructions to the point information generating means 12 to issue points corresponding to the number of merchandises purchased.

Figure 3:
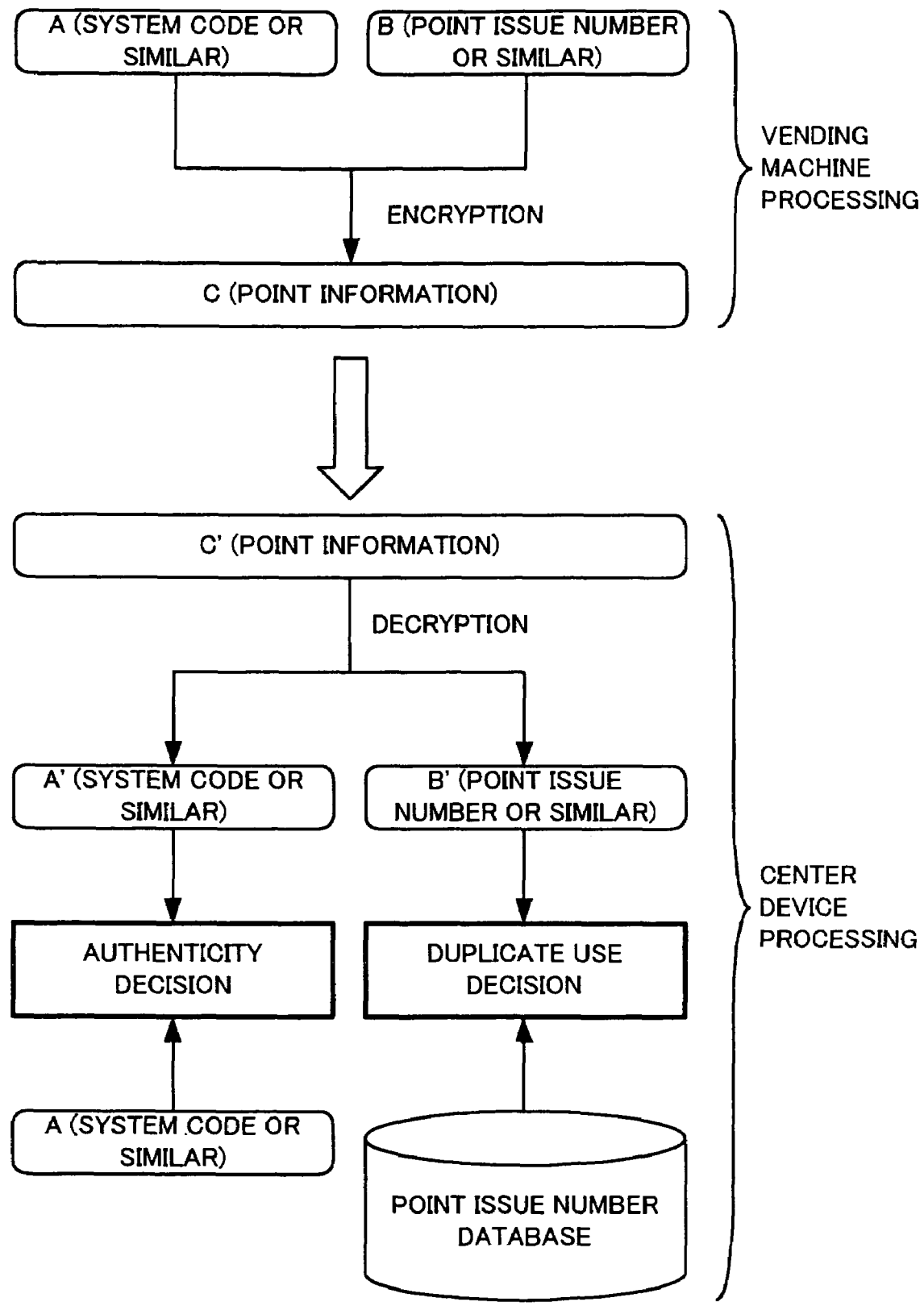
FIG. 3 is a diagram explaining the point information in the promotion system of FIG. 1.

The point information generated by the point information generation unit 12 may be of any kind, so long as its authenticity can be confirmed by the center device 3 (FIG. 1); for example, it may be generated by the method shown in FIG. 3.

That is, the point generation unit 12 encrypts information characteristic of the system A (such as a system code) and information characteristic of the points issued B (such as a point issue number) based on a prescribed encryption key, as shown in FIG. 3, to generate the point information C, and displays this visibly on the point information display unit 13.

Thereafter, the purchaser transmits this displayed information C to the center device 3 using a portable telephone set 2.

On receiving the point information C' (which, if genuine, is identical to the point information C), the center device 3 uses the prescribed decryption key to obtain the information A' and information B'.

Then, by comparing the information A' with information A characteristic of the system stored in advance in the center device 3 (such as a system code), the authenticity of the point information is confirmed (authenticity decision).

The information B' is retrieved from a point issue number database managed by the center device 3, to confirm that the number is unused (duplicate use decision).

Next, transmission of point information using a portable telephone set 2, and processing by the center device 3, are explained.

Figure 4:
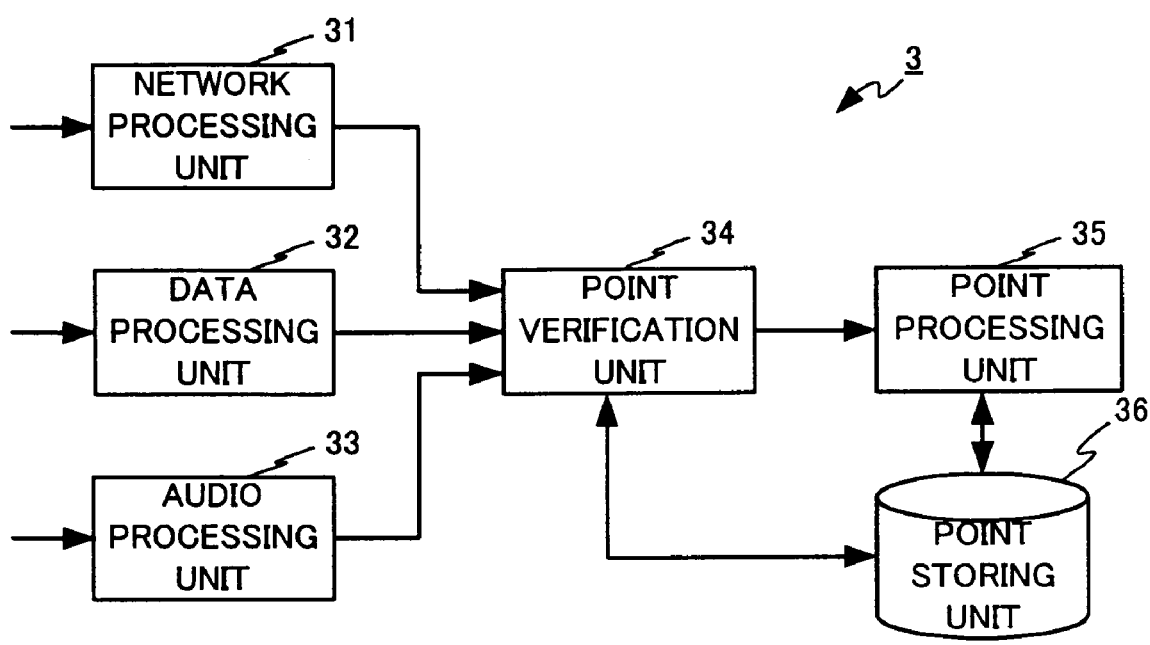
FIG. 4 is a block diagram depicting the center device of FIG. 1.

FIG. 4 is a block diagram of the configuration of the center device 3.

As shown in FIG. 4, the center device 3 comprises the network processing unit 31, data processing unit 32, audio processing unit 33, point verification unit 34, point processing unit 35, and point storing unit 36.

The network processing unit 31 is connected to the Internet or some other network, and obtains point information from a mail server or web server, not shown.

This network processing unit 31 operates when point information is transmitted via electronic mail or a prescribed web page, that is, when point information is transmitted from a portable telephone set 2 with Internet compatibility or from a computer.

The data processing unit 32 obtains point information transmitted from a portable telephone set 2 by means of specific mail and data transmission methods. That is, the data processing unit 32 operates when point information is transmitted from a portable telephone set 2 having specific data transmission functions.

The audio processing unit 33 obtains point information transmitted by audio signals, such as the purchaser's voice or a push-tone telephone. That is, the audio processing unit 33 operates when point information is transmitted as audio signals from a portable telephone set 2 or from an ordinary telephone set.

The point verification unit 34 verifies the authenticity of the point information received by the methods described above, and when the information is verified to be authentic, further verifies that the point information is unused. This processing is performed in anticipation of cases in which the same point information is transmitted a plurality of times, either through carelessness of the purchaser, or with malicious intent.

The point processing unit 35 manages point information, which has been verified by the point verification unit 34 to be authentic and also unused, by transmitter (purchaser), and adds the number of points of the received point information to the number of points stored in the point storing unit 36.

The network processing unit 31, data processing unit 32, and audio processing unit 33 need not all be provided; when constraints are imposed on the method of transmission of point information, a part of these can be omitted. For example, if the system is arranged such that point information can be transmitted only from a portable telephone set 2 connected to the Internet, then the data processing unit 32 and audio processing unit 33 can be omitted.

Figure 5:
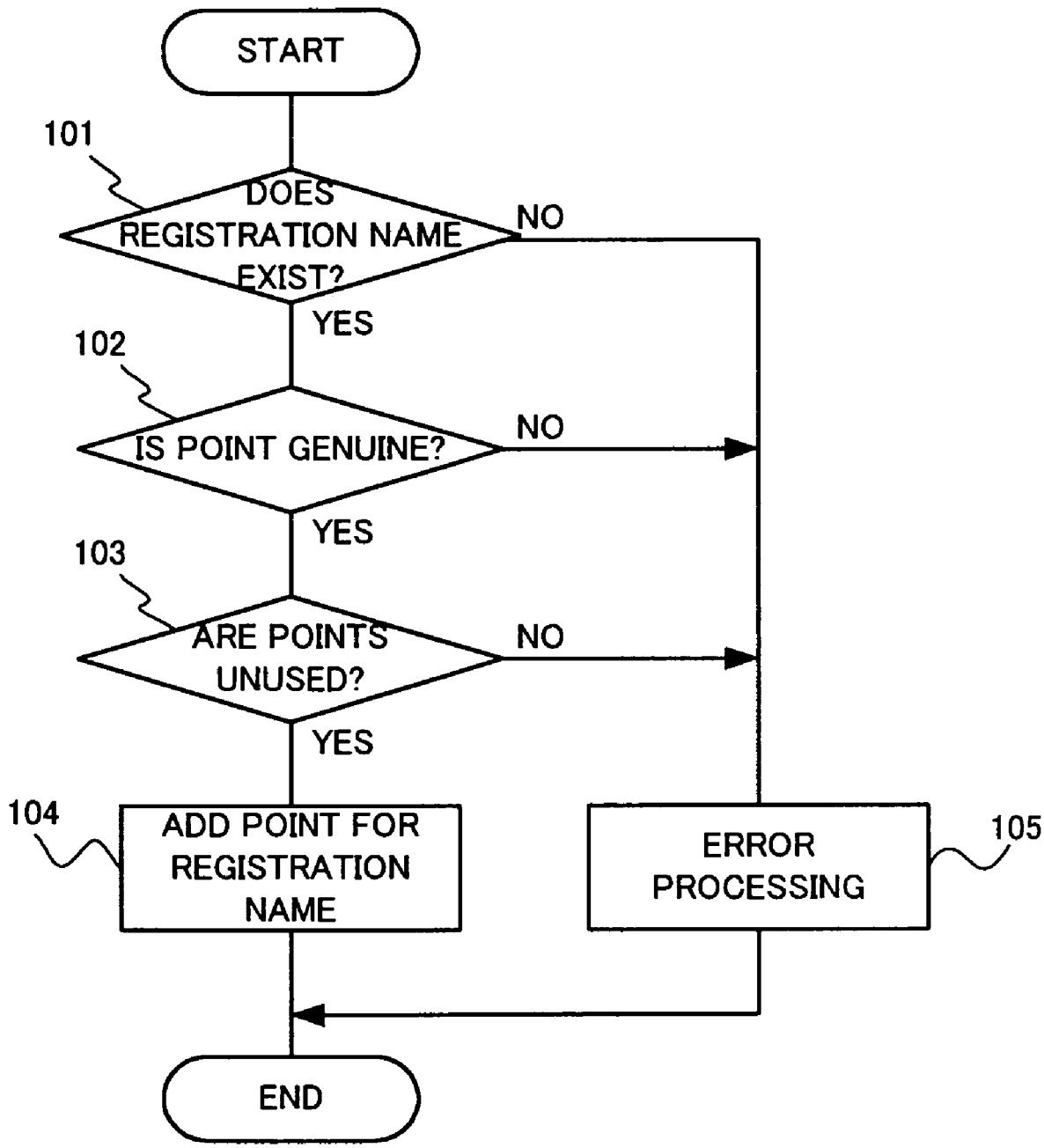
FIG. 5 is a flowchart showing the flow of operation of the center device of FIG. 1.

Here the operation of the center device 3 is explained, referring to FIG. 5.

FIG. 5 is a flowchart showing the flow of operation of the center device 3.

In the center device 3, when point information is obtained from either the network processing unit 31, the data processing unit 32, or the audio processing unit 33, the point verification unit 34 refers to the point storing unit 36 to decide whether the registration name received together with the point information (the name, freely registered, of the transmitter of the point information) exists (step 101), and if it does exist (YES in step 101), verifies that the point information is genuine (step 102).

If as a result the point information is found to be genuine (YES in step 102), processing is performed to verify that the points are unused (step 103).

If as a result the point information is found to be unused (YES in step 103), the point processing unit 35 adds a number of points to the number of points for the registration name stored in the point storing unit 36, based on the received point information (step 104), and processing is terminated.

If the registration name does not exist (NO in step 101), or if the points are inauthentic (NO in step 102), or if the points have been used a plurality of times NO in step 103), then error processing is executed in which addition of points is not performed (step 105), and processing is terminated.

In error processing, in addition to merely not adding points, it is also possible to total the number of instances of error processing for the registration name, and to cancel registration if the cumulative number of error processing instances for a registration name exceeds a prescribed number. If a registration name does not exist, it is also possible to accept registration, and then to execute processing for step 102 and subsequent steps.

At the vending machine 1, the point information display unit 13 displays point information; and it is possible that some malicious third party other than the merchandise purchaser may see the display and transmit points, or may misuse point information displayed to a purchaser not desiring points.

Here the case in which display of point information at the vending machine 1 is limited, to display only the minimum necessary point information, is explained.

Figure 6:
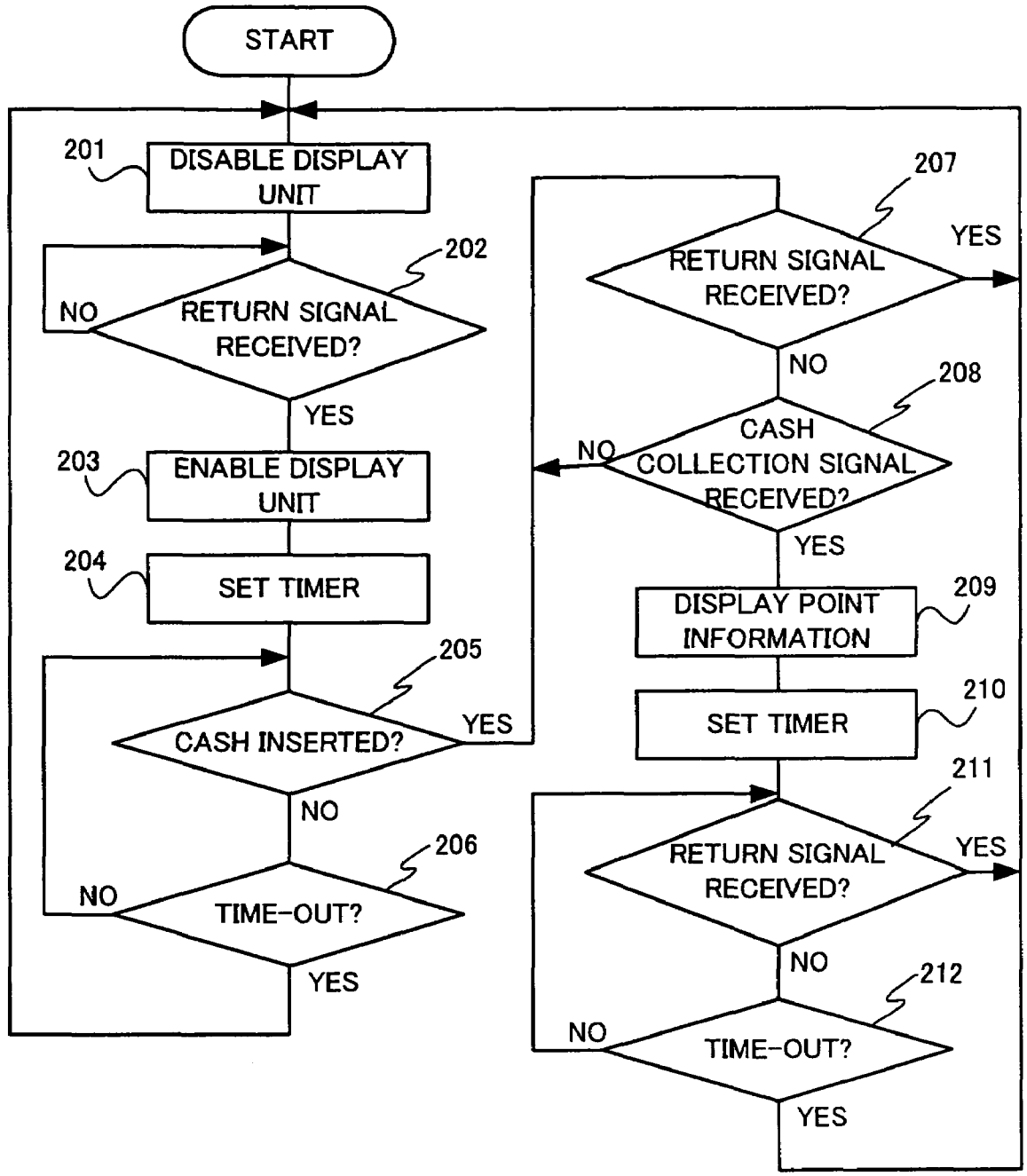
FIG. 6 is a flowchart showing the flow of processing of a vending machine when point information display is limited.

FIG. 6 is a flowchart showing the flow of processing of a vending machine when point information display is limited.

When the vending machine 1 begins operation, first the point information display unit 13 disables the display unit (step 201), and then receipt of a return signal is awaited (step 202). A return signal is a signal which is generated when, in the vending machine 1, a return lever is operated to order the return of a bill (paper money); in the vending machine 1, operation of this return lever is used to order the display of point information.

When a return signal is received (YES in step 202), the point information display unit 13 enables the display unit (step 203) and sets a timer (step 204).

If cash is not inserted during the time interval before the timer, having been set, times out, execution returns to step 201 and the display unit is disabled (NO in step 205, YES in step 206); if cash is inserted during the above time interval (YES in step 205), receipt of a cash collection signal is awaited (step 208), so long as a new return signal is not received (step 207).

Here a cash collection signal is a signal indicating that cash has been collected by the coin processing unit 15 or by the bill processing unit 16 upon sale of merchandise. By this means, the sale of merchandise can be verified.

When a cash collection signal is received (YES in step 208), the point information generation unit 12 generates point information, the point information display unit 13 displays point information (step 209), and the timer is set (step 210).

Thereafter, during the interval until receipt of a repayment signal due to operation of the return lever by the purchaser (indicating the intention of erasing the display) or until time-out of the timer, the point information is displayed (NO in step 211, NO in step 212), and upon either receipt of a repayment signal (YES in step 211) or time-out of the timer (YES in step 212), execution returns to step 201 and the display unit is disabled, that is, the display of point information is erased.

In this way, display of point information is controlled through expression of the intention of the purchaser, and misuse of point information can be prevented by employing a timer to cope with inaction by the purchaser.

Next, a second embodiment of this invention is explained.

Figure 7:
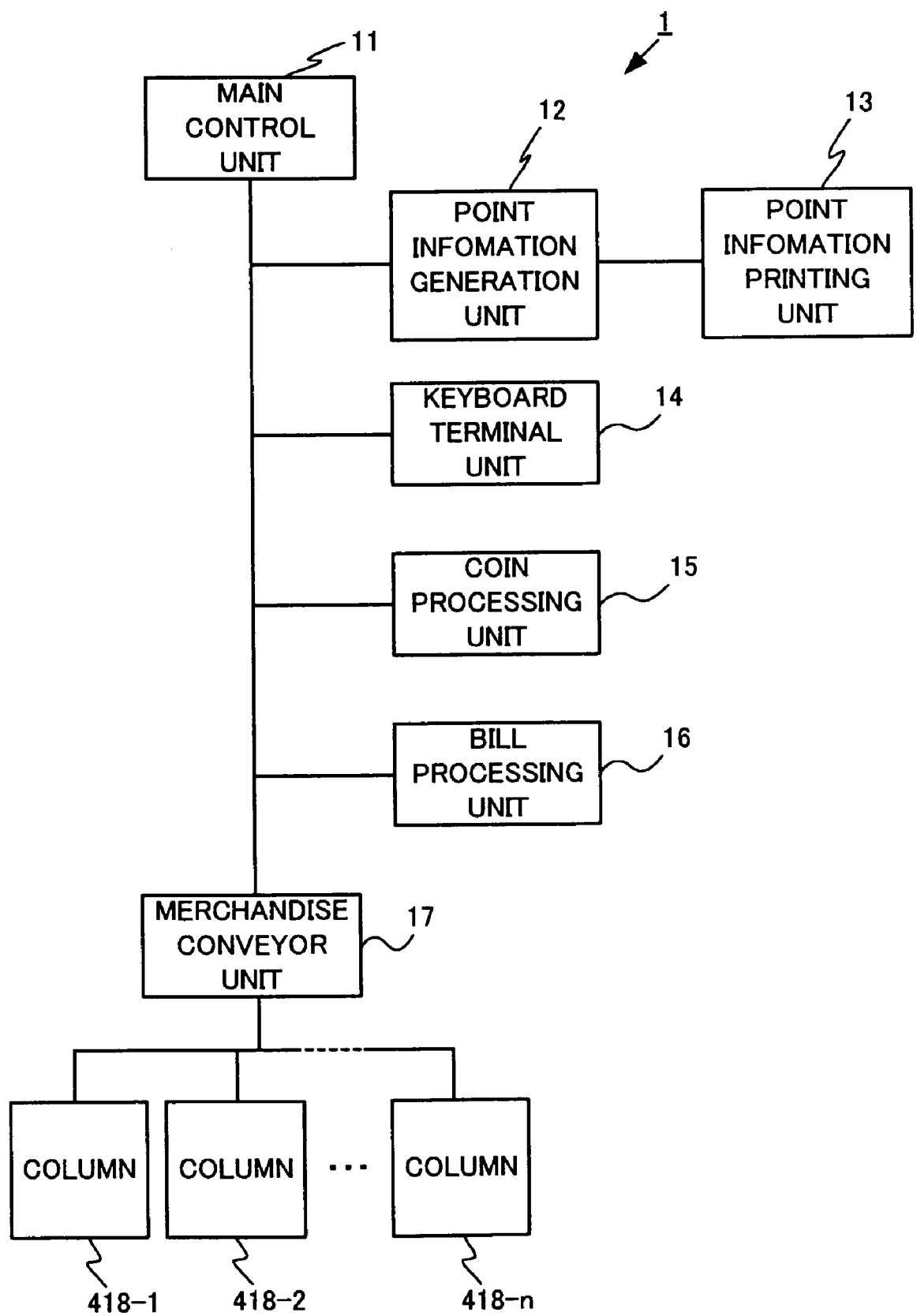
FIG. 7 is a block diagram depicting the configuration of a vending machine in a second embodiment of this invention.

FIG. 7 is a block diagram showing the configuration of a vending machine in a second embodiment of this invention.

As shown in FIG. 7, the vending machine 1 comprises a main control unit 411, point information generation unit 412, point information printing unit 413, keyboard terminal unit 414, coin processing unit 415, bill processing unit 416, merchandise conveyor unit 417, and columns 418 (from 418-1 to 418-*n*).

The main control unit 411 controls each of the units, and controls the sale of merchandise and issuing of points. The point information generation unit 412 generates point information based on control signals from the main control unit 411, and the point information generated by this point information generation unit 412 is printed on a prescribed form, for example a sales receipt, by the point information printing unit 413.

The keyboard terminal unit 414 sets various values, such as price, for the merchandise to be sold. The coin processing unit 415 receives coins corresponding to the merchandise price and returns change; the bill processing unit 416 receives paper money and performs related processing. The merchandise conveyor unit 417 dispenses merchandise based on control signals from the main control unit 411, to control dispensation of merchandise stored in the columns 418. The columns 418 store various merchandise items.

This vending machine 1 of this second embodiment differs from the vending machine 1 of the first embodiment only in that point information is printed on a form; otherwise the configuration is similar to that of the vending machine 1 of the first embodiment. Hence a detailed description is omitted. Moreover, simply by substituting "printing" for "display," the display control explained referring to FIG. 6 can be applied to the vending machine of the second embodiment.

Next, a third embodiment of this invention is explained.

Figure 8:
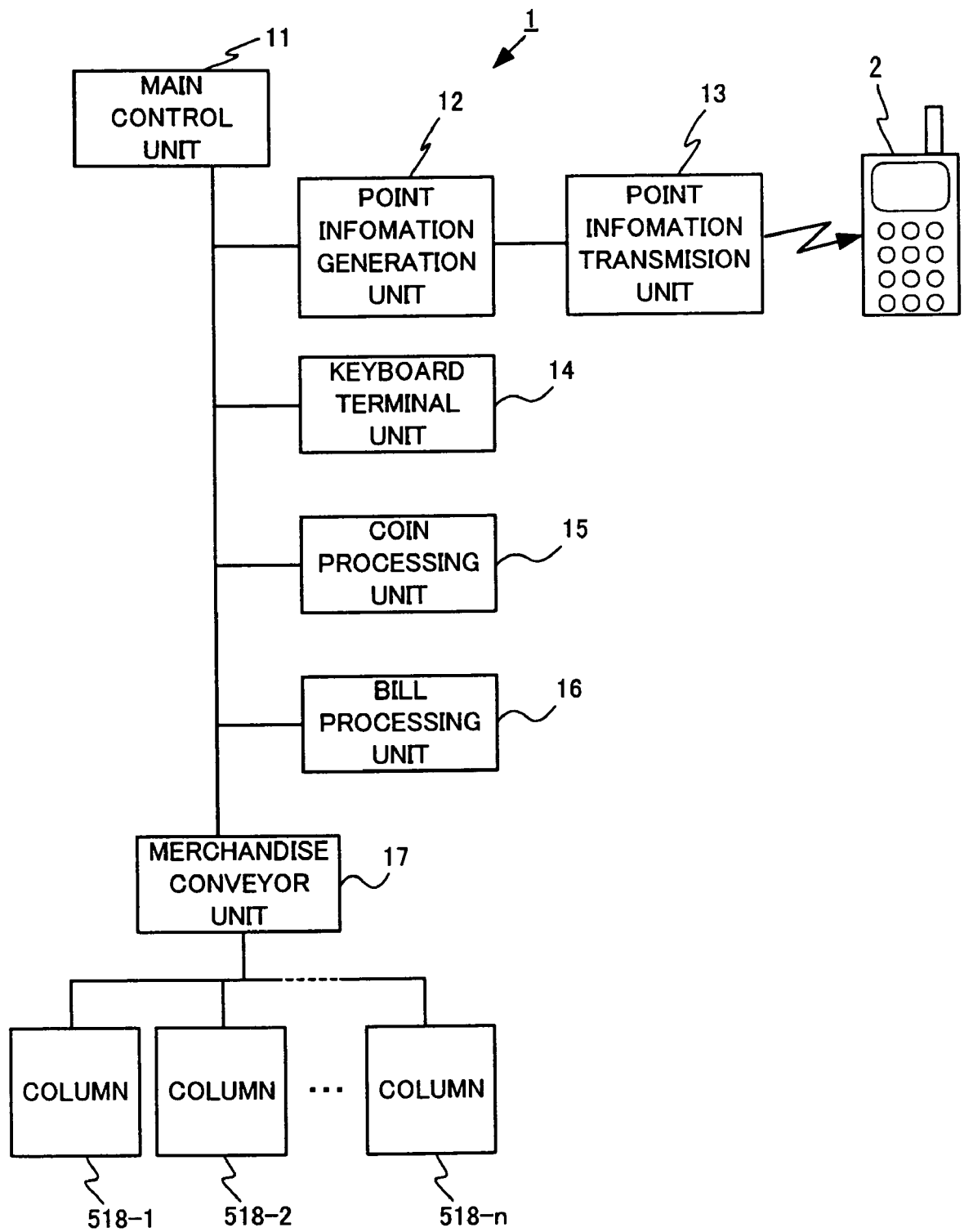
FIG. 8 is a block diagram depicting the configuration of a vending machine in a third embodiment of this invention.

FIG. 8 is a block diagram depicting the configuration of a vending machine in a third embodiment of this invention.

As shown in FIG. 8, the vending machine 1 comprises a main control unit 511, point information generation unit 512, point information transmission unit 513, keyboard terminal unit 514, coin processing unit 515, bill processing unit 516, merchandise conveyor unit 517, and columns 518 (from 518-1 to 518-*n*).

The main control unit 511 controls each of the units, and controls the sale of merchandise and issuing of points. The point information generation unit 512 generates point information based on control signals from the main control unit 511, and the point information generated by this point information generation unit 512 is transmitted to a portable telephone set 2 by the point information transmission unit 513. This point information transmission is performed using infrared communication, a communication function of information equipment comprised by the portable telephone set 2, and wireless communication or similar.

The keyboard terminal unit 514 sets various values, such as price, for the merchandise to be sold. The coin processing unit 515 receives coins corresponding to the merchandise price and returns change; the bill processing unit 516 receives paper money and performs related processing. The merchandise conveyor unit 517 dispenses merchandise based on control signals from the main control unit 511, to control dispensation of merchandise stored in the columns 518. The columns 518 store various merchandise items.

In this third embodiment also, the vending machine 1 is different from the vending machine 1 of the first embodiment only in that the point information is transmitted to a portable telephone set 2; otherwise the configuration is similar to that of the vending machine 1 of the first embodiment. Hence a detailed description is omitted. Moreover, simply by substituting "transmission" for "display," the display control explained referring to FIG. 6 can be applied to the vending machine of the third embodiment.

In each of the above-described embodiments, explanations were given for examples in which the issuing of points of this invention was applied to a vending machine; however, application to cash registers and to other equipment is also possible, and by this means it is possible to issue points for both merchandise sold in vending machines and for merchandise sold in stores. In particular, the printing of point information as explained in the above-described second embodiment is possible, in the case of cash registers, by printing onto sales receipts.

Next, a detailed example of the configuration of a promotion system of this invention is explained.

Figure 9:
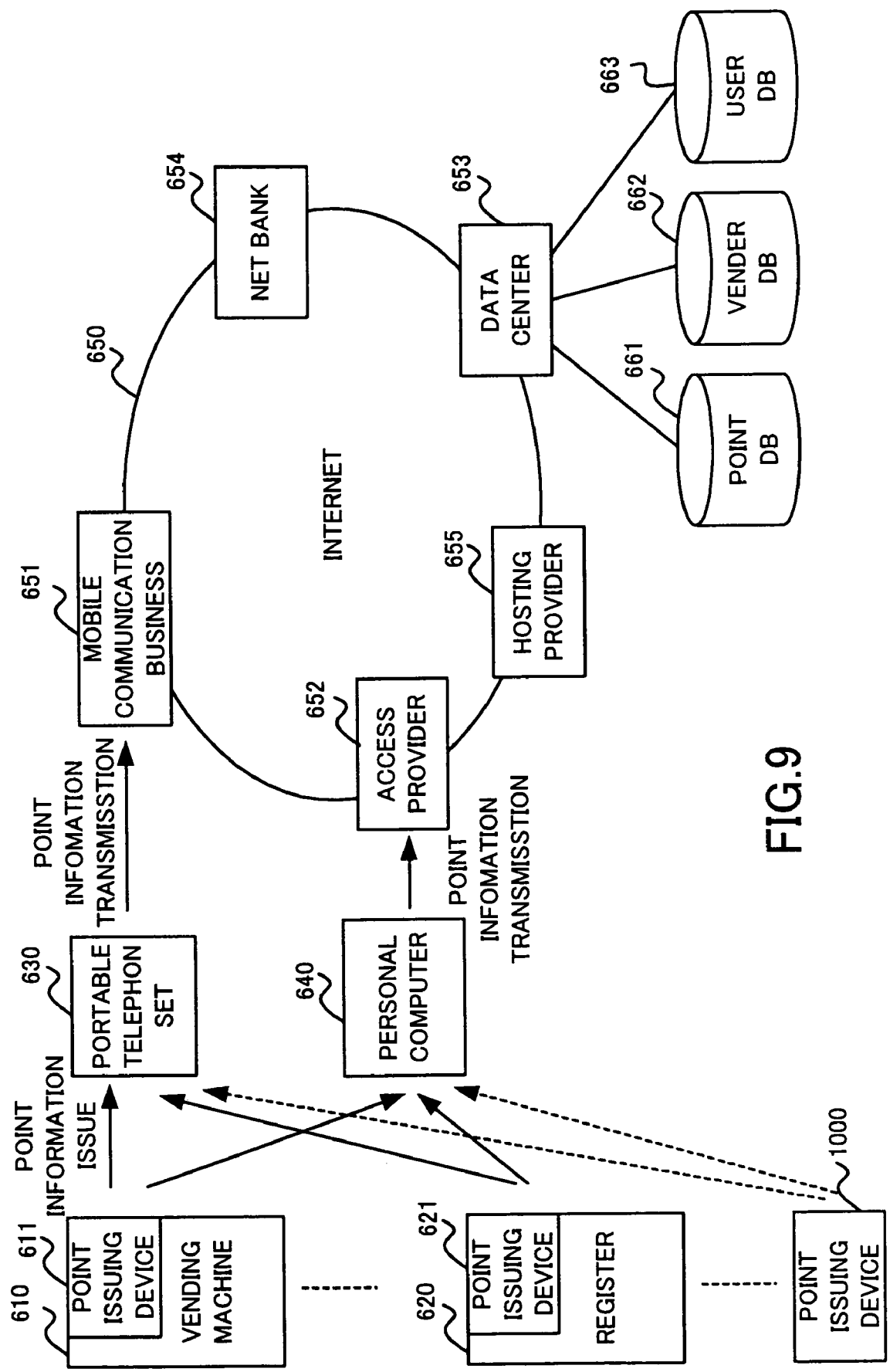
FIG. 9 is a system configuration diagram showing one example of the configuration of a promotion system of this invention.

FIG. 9 is a system configuration diagram showing one example of the configuration of a promotion system of this invention.

In FIG. 9, the issuing of points in the promotion system is applied to a plurality of vending machines 610, placed either outdoors or indoors, and to cash registers 620 provided in each store.

In other words, this promotion system enables the promotion of sales of the merchandise of vending machines 610, and the promotion of sales of various merchandise of stores in which cash registers 620 are provided.

Each of the vending machines 610 is provided with a point issuing device 661 relating to the present invention, and each of the cash register 620 is also provided a point issuing device 621 relating to the present invention.

Here, the point issuing devices 611 and 621 may be either incorporated in the vending machine 610 and the cash register 620 respectively, or manufactured separately from and attached to the vending machine 610 and cash register 620. Further, an independent point issuing device 1000 may be provided.

The point issuing devices 611 and 621 comprise either the point information generation unit 12 and point information display unit 13, shown in FIG. 2; or, the point information generation unit 412 and point information printing unit 413, shown in FIG. 7; or, the point information generation unit 512 and point information transmission unit 513, shown in FIG. 8; or, some combination of these.

In the configuration shown in FIG. 9, the point issuing device 611 of the vending machine 610 generates point information corresponding to the merchandise sale amount, number of merchandise items, and other information each time merchandise is sold by the vending machine 610, and this point information is displayed by a display unit, not shown in the figure, provided in the point issuing device 611.

The point issuing device 621 of the cash register 620 similarly generates point information corresponding to the merchandise sale amount, number of merchandise items, and other information each time a merchandise sale is processed by the cash register 620, and this point information is displayed by a display unit, not shown in the figure, provided in the point issuing device 621.

An independent point issuing device 1000 similarly generates point information corresponding to the merchandise sale amount, number of merchandise items, and other information each time a prescribed merchandise sale is processed, and this point information is displayed by a display unit, not shown in the figure, provided in the point issuing device 1000.

The above point information comprises:
1) A module code
2) A secret code

The module code identifies the above point issuing devices 611, 621; in this promotion system, the states of the vending machine 610 and cash register 620 corresponding to module codes are stored and managed in a vendor database at a data center 653.

The secret code comprises:
1) A point issue number
2) A number of points
3) A parity The point issue number is a sequential number which is issued each time a point is issued from point issuing devices 611, 621 and so on; this point issue number is used to verify that the point information is not double-used and is not being used illicitly.

In other words, if the point issue number of point information received by the data center 653 is identical to a point issue number for point information previously received, it is judged to have been used more than once; and if the point issue number of point information received by the data center 653 is abnormally distant from the point issue number of the preceding point information received as genuine, then it is judged that the point information may possibly have been used illicitly.

The number of points is the number of points acquired by the user upon a purchase; the parity is information added in order to verify that there have been no errors or alteration during transmission by the user of point information, including the encryption and decryption processes. A hash function, cyclical code or similar may be used as this added information.

The secret code is generated by encrypting the above information using an encryption key, stored in advance.

The basis of the method by which users of this promotion system acquire point information from point issuing devices 611, 621 is the reading of point information displayed on the display units of the point issuing devices 611, 621 and its memorizing on a pad of paper or similar.

The user of the promotion system then inputs this memorized point information into a portable telephone set 630 carried by the user or into a personal computer 640, for transmission, together with an ID (identification information) identifying the user and a prescribed password, to a data center 653, described in detail below (corresponding to the center device 3 shown in FIG. 1).

In order to facilitate the method described above, in this promotion system, an infrared communication device is incorporated into the point issuing devices 611, 621, and using this infrared communication device, input of the above point information into the above portable telephone set 630 or similar is facilitated.

Means for printing and output of the above point information may also be provided in the point issuing devices 611, 621.

The point issuing device 621 of the cash register 620 may also be configured such that point information generated by this point issuing device 621 is printed onto a sales receipt printed and output by the cash register 620.

The data center 653 is realized as a web server on the Internet 650.

In this data center 653 are provided a point database 661 to store and manage, by user ID, points acquired by users; a vendor database 662 to store and manage, by the above module code, the states of vending machines 610 and cash registers 620 and other information; and a user database 663 to store and manage the individual information of users.

Transmission of point information to this data center 653 from a portable telephone set 630 carried by a user is performed via the portable telephone set 630, a mobile communication business 651, and the Internet 650.

Transmission of point information to this data center 653 from a user's personal computer 640 is performed via the personal computer 640, user's Internet access provider 652, and the Internet 650.

When the data center 653 receives point information from the portable telephone set 630 or personal computer 640 of a user, first the user database 663 is referenced to verify the ID and password of the user.

Next, the vendor database 662 is referenced, to verify the module code.

Then, the secret code is decrypted, parity is checked, the point issue number is checked, and the number of points is checked; based on the result of these checks, the point database 661 is updated.

The data center 653 performs the following operations.

1) Management of users based on registration in and updating of the user database 663

2) Management of points based on the point database 661

3) Management of point issuing devices based on registration in and updating of the vendor database 662

4) Management of various lotteries and lottery winners based on points stored in the point database 661

5) Furnishing of marketing information to managers of vending machines 610 and to stores and other entities provided with cash registers 620

6) Management of the sales information, merchandise, change, malfunctions, and other circumstances of vending machines 610

On the above Internet 650 are also provided network banks 654 which act as agents in settlement of points for the data center 653, and web hosting providers 655 which deliver web pages, in place of the data center 653, in order to furnish marketing information to the managers of vending machines 610 and to stores and other entities provided with cash registers 620.

Next, details of the operation of the above promotion system are explained with reference to the flowcharts shown in FIG. 10 through FIG. 14.

Figure 10:
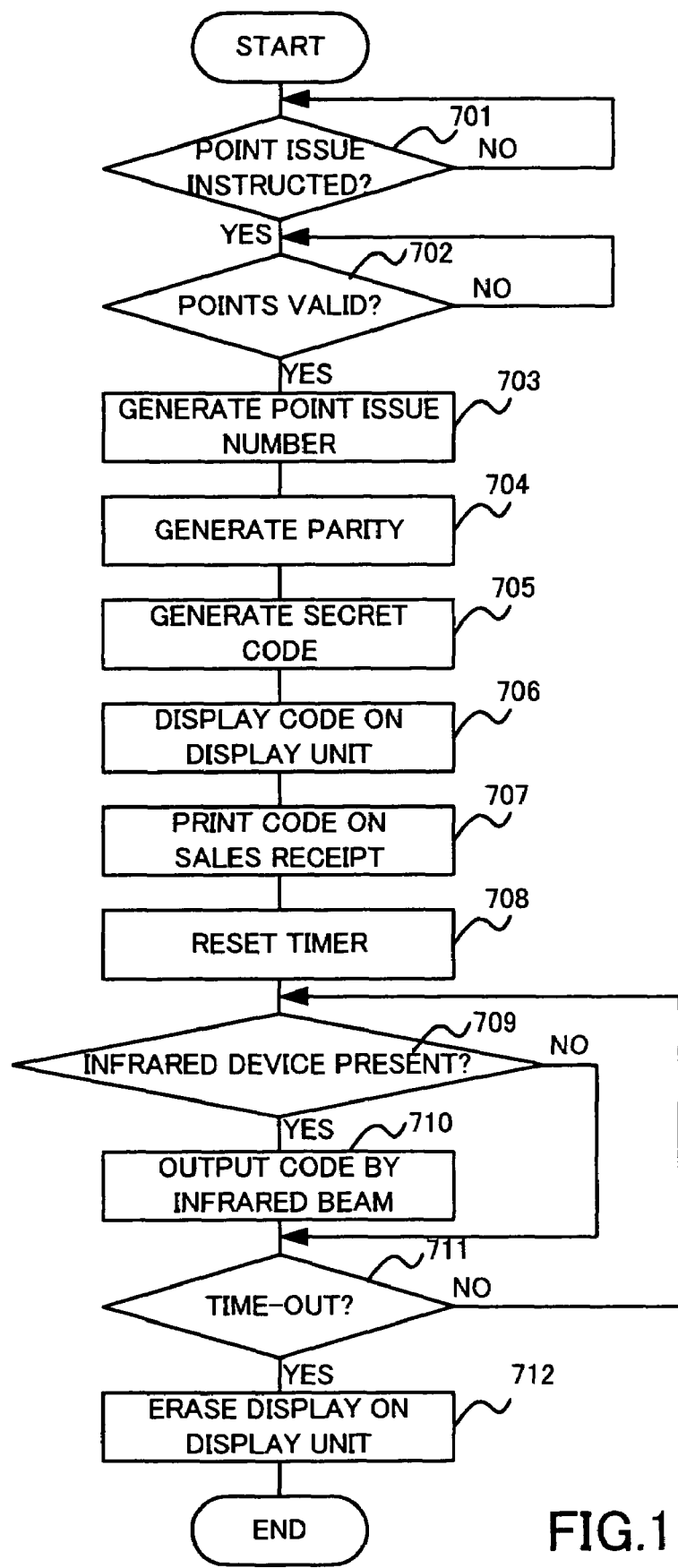
FIG. 10 is a flowchart showing the details of processing of the point issuing devices shown in FIG. 9.

FIG. 10 is a flowchart showing the details of processing of the point issuing devices shown in FIG. 9 (point issuing devices 611 and 621).

In FIG. 10, the point issuing device first checks whether there is a point issue instruction from the vending machine 610 or from the cash register 620 (step 701). If it is judged that there has been no point issue instruction, execution returns to step 701, and a point issue instruction is awaited.

In step 701, if there is a point issue instruction from the vending machine 610 or cash register 620 (YES in step 701), the validity of the number of points of the point issue instruction is checked (step 702). If it is judged that the number of points is invalid (NO in step 702), execution returns to step 702; if it is judged valid (YES in step 702), a point issue number is generated (step 703). Generation of this point issue number is performed by adding 1 to the preceding point issue number.

Next, a parity is generated (step 704). Parity generation is performed by, for example, delimiting the point issue number generated in step 704 and the number of points judged to be valid in step 702 at every n bits and adding, then dividing the result by m to obtain the remainder as the parity.

Then the secret code is generated (step 705). Generation of the secret code is performed by encrypting the above point issue number, number of points, and parity using an encryption key which has been stored in advance.

The secret code generated in this way is displayed (step 706) by the display unit of the point issuing device as point information together with the module code for the point issuing device, and is similarly printed on a sales receipt (step 707).

Next, a timer is reset (step 708) in order to limit the display of point information on the display unit, and a check is performed for the presence in this point issuing device of an infrared device for output of the above point information (step 709).

If it is judged that an infrared device is present (YES in step 709), the above point information (code) is output by infrared beam (step 710).

A check is performed to determine whether time-out of the timer has occurred (step 711), and if time-out has not occurred (NO in step 711), execution returns to step 709; but if it is judged that time-out has occurred (YES in step 711), information display on the display unit is erased (step 712), and processing is terminated.

Figure 11:
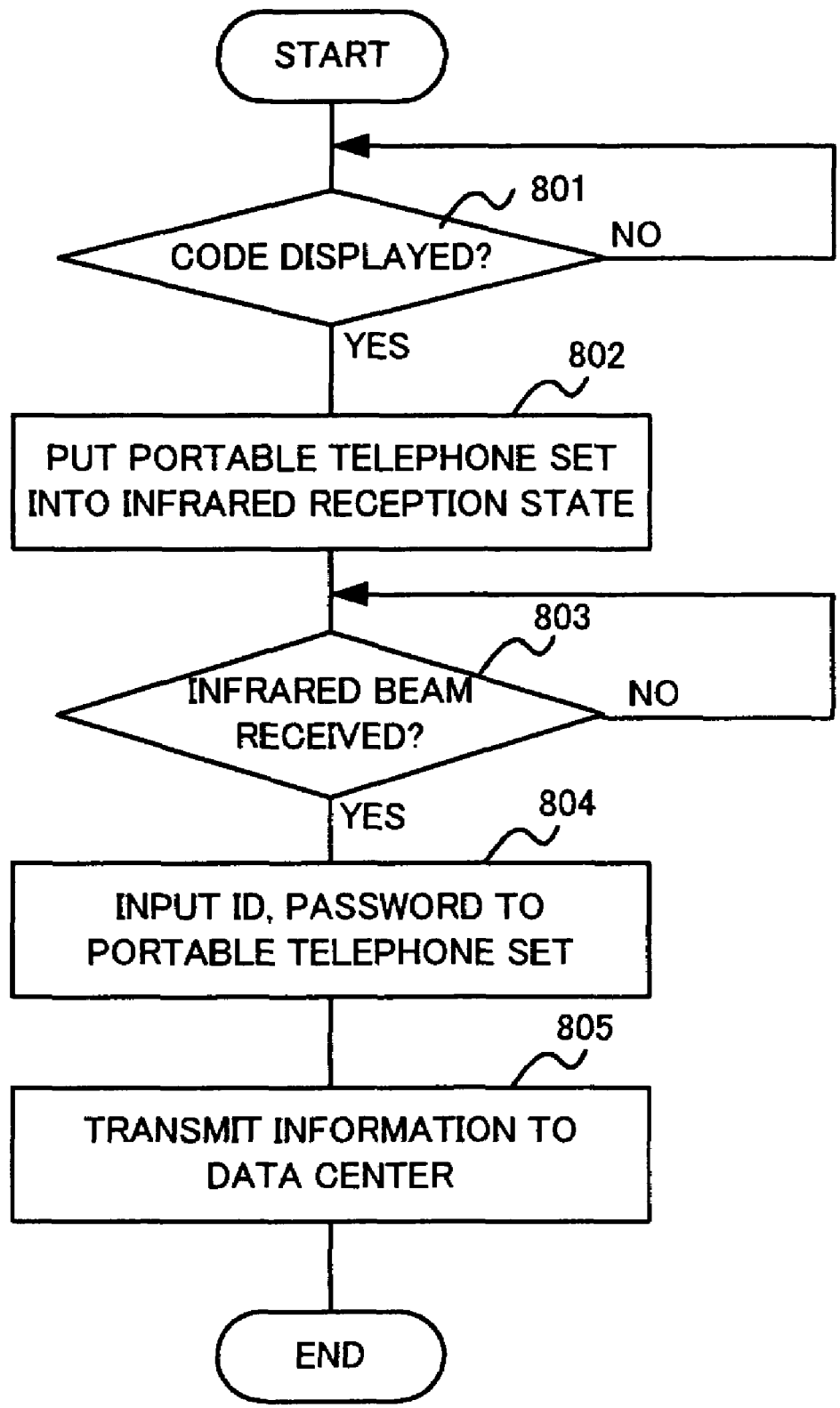
FIG. 11 is a flowchart showing the processing of a portable telephone set when transmitting to the data center point information, output by infrared beam from a point issuing device, and input using an infrared reception function of the portable telephone set.

FIG. 11 is a flowchart showing the processing of a portable telephone set when transmitting to the data center point information, output by infrared beam from a point issuing device, and input using an infrared reception function of the portable telephone set.

In FIG. 11, first a check is performed to determine whether a code, namely point information, is displayed on the point issuing device (step 801). Here if no code is displayed on the point issuing device (NO in step 801), execution returns to step 801, and display of a code on the point issuing device is awaited.

When a code is displayed on the point issuing device (YES in step 801), the portable telephone set 630 is put into an infrared reception state (step 802).

Then a check is performed to determine whether the portable telephone set 630 has received an infrared beam, that is, whether point information issued by the point issuing device has been input via infrared beam (step 803).

If it is judged that an infrared beam has not been received (NO in step 803), execution returns to step 803, and receipt of point information via infrared beam is awaited. If it is judged that an infrared beam has been received (YES in step 803), the user's ID and password a are then input to the portable telephone set (step 804), and the point information is transmitted to the data center 653 (step 805).

Figure 12:
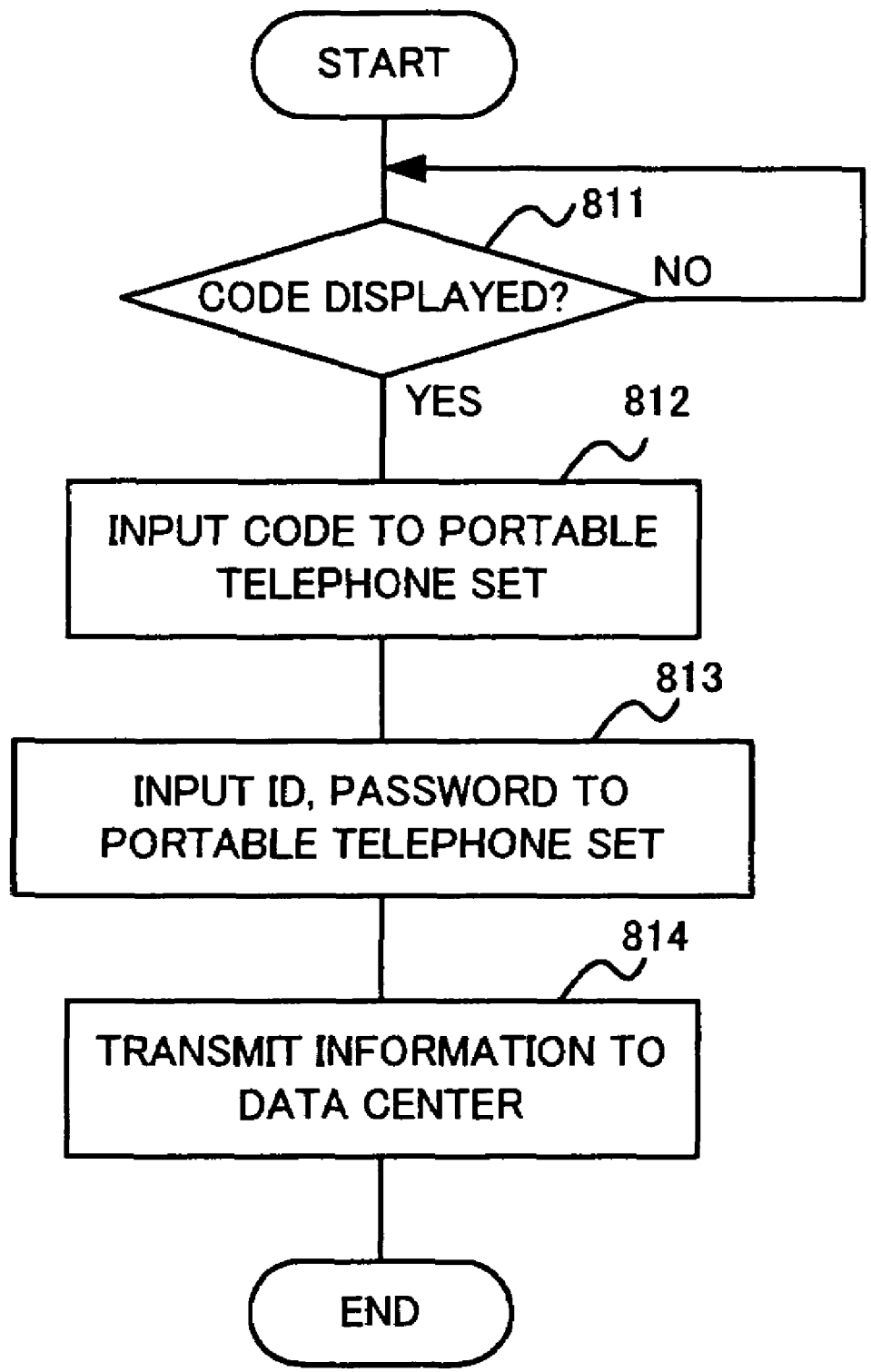
FIG. 12 is a flowchart showing the processing of a portable telephone set when transmitting to the data center point information, displayed on the display of a point issuing device, and input to the portable telephone set.

FIG. 12 is a flowchart showing the processing of a portable telephone set 630 when transmitting to the data center point information, displayed on the display of a point issuing device, and input to the portable telephone set 630.

In FIG. 12, first a check is performed to determine whether a code, namely point information, is displayed on the point issuing device (step 811). Here if no code is displayed on the point issuing device (NO in step 811), execution returns to step 811, and display of a code on the point issuing device is awaited.

When a code is displayed on the point issuing device (YES in step 811), the user of the portable telephone set 630 views the display and inputs to the portable telephone set 630 the code, that is, the point information displayed on the display unit of the point issuing device (step 812).

Then, the ID and password of the user are input to the portable telephone set (step 813), and the point information is transmitted to the data center 653 (step 814).

Figure 13:
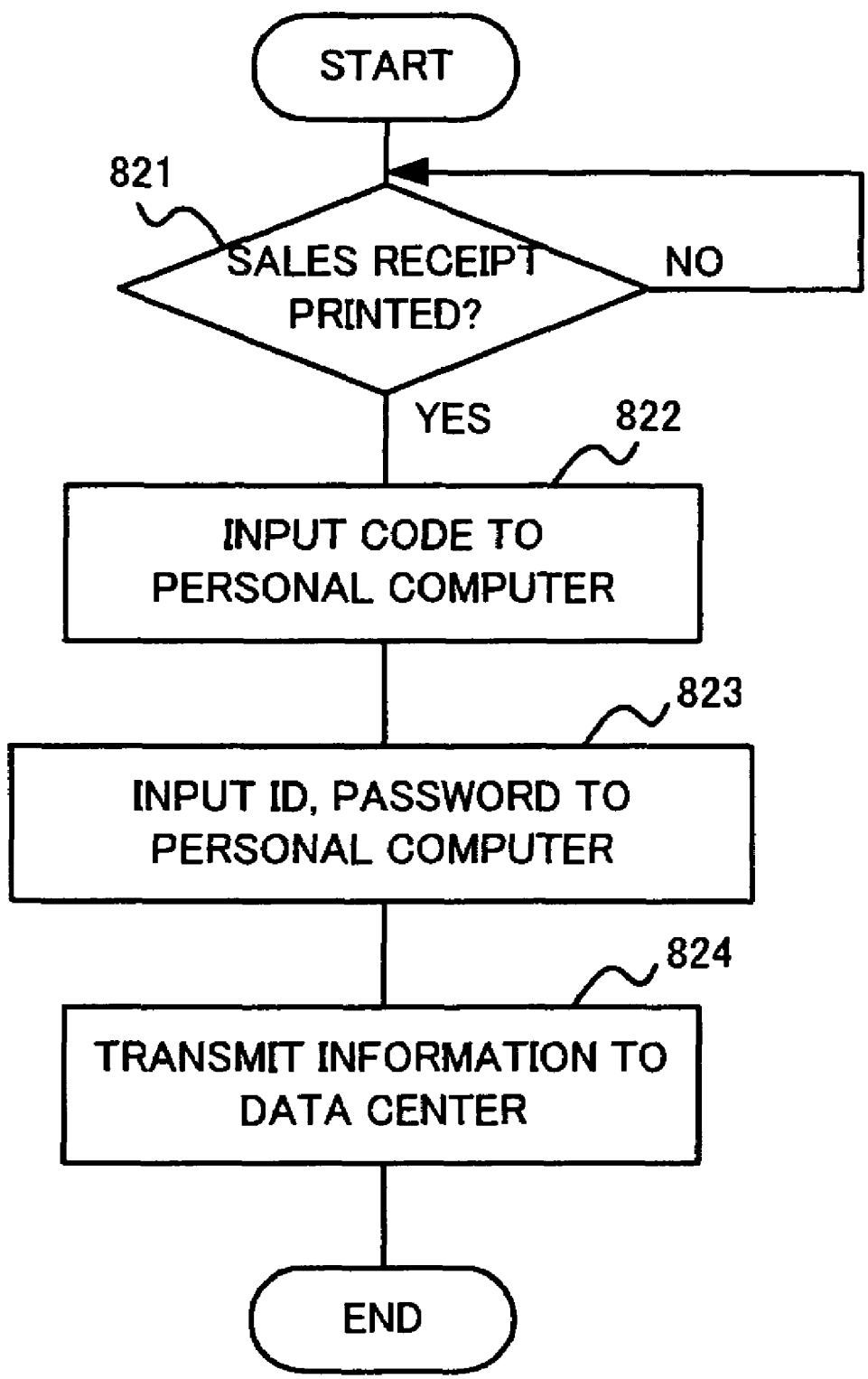
FIG. 13 is a flowchart showing the processing of a personal computer when inputting to the personal computer point information, based on information printed on a sales receipt output from a point issuing device, for transmission to the data center.

FIG. 13 is a flowchart showing the processing of a personal computer 640 when inputting to a personal computer 640 point information, based on information printed on a sales receipt output from a point issuing device, for transmission to the data center.

In FIG. 13, first a check is performed to determine whether there is printed output on a sales receipt with point information printed by a point issuing device (step 821). If there is no printed output on a sales receipt from a point issuing device (NO in step 821), execution returns to step 821, and printed output on a sales receipt from a point issuing device is awaited.

When there is printed output on a sales receipt with point information printed (YES in step 821), the user of this system receives the sales receipt, and later the user reads the sales receipt and inputs into the personal computer 640 the code, that is, the point information displayed on the display unit of the point issuing device (step 822).

Then the user inputs the user's ID and password into the personal computer 640 (step 813), and transmits the point information to the data center 653 (step 814).

Figure 14:
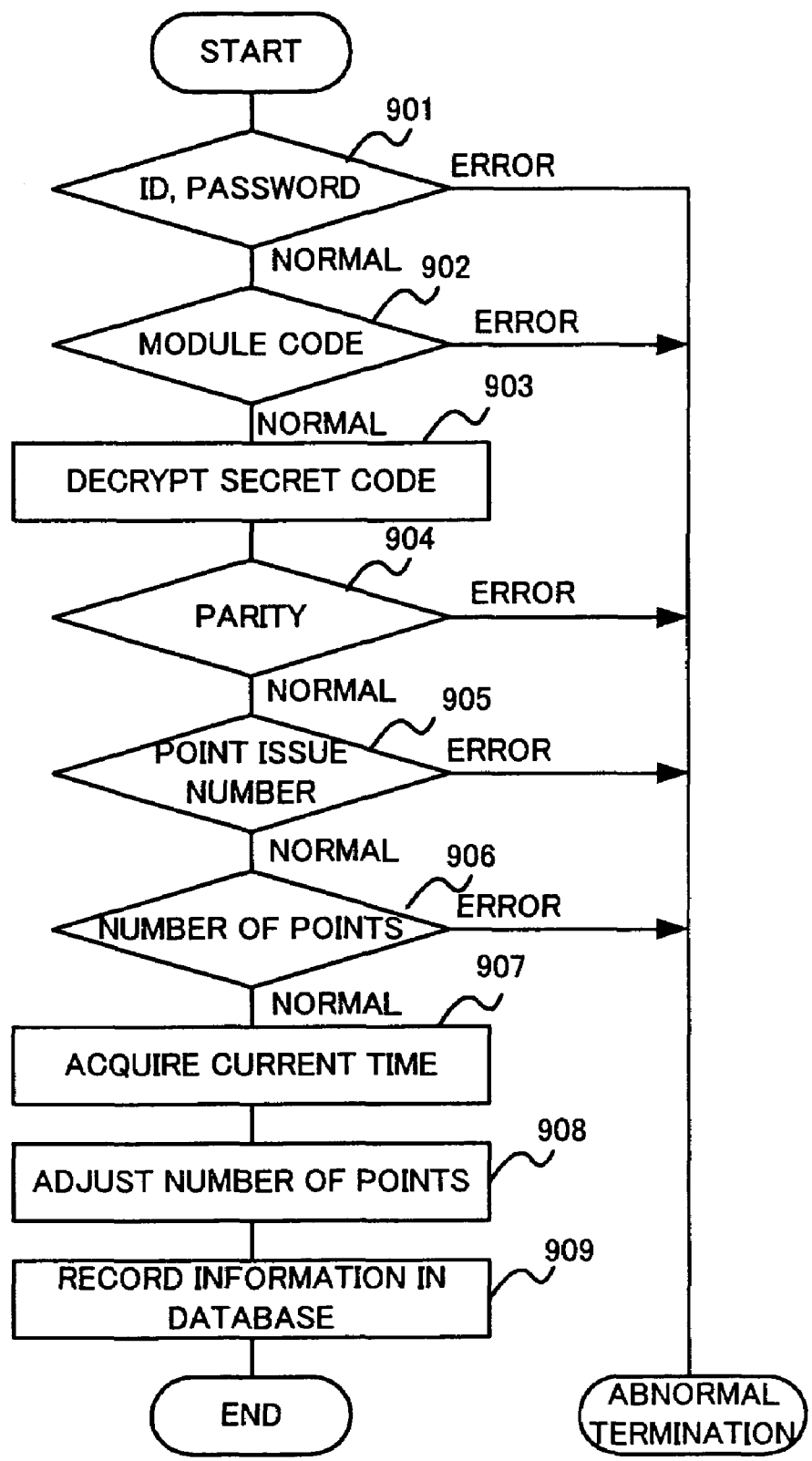
FIG. 14 is a flowchart showing processing at the data center after receiving point information.

FIG. 14 is a flowchart showing processing at the data center 653 after receiving the above point information.

In FIG. 14, the data center 653 checks the user ID and password transmitted together with the above point information (step 901). This check of the user ID and password is performed by referencing the user database 663, to verify that the user ID has been registered, that the password is correct, that the user ID is not registered in a negative list, and by similar actions.

If it is judged that the user ID and password are normal, next a check of the module code comprised by the point information is performed (step 902). This check of the module code is performed by referencing the vendor database 662, to verify that the module code exists and that it is not registered in a negative list.

If the module code is judged to be normal, then decryption of the secret code comprised by the point information is performed (step 903).

When decryption of the secret code is completed, a check is performed using the parity (step 904).

If the parity is normal, then the point issue number is checked (step 905). This check of the point issue number is performed by verifying that the number has not been used more than once, and that the number is not greatly distant from the point issue number issued immediately before by the same module. If the point issue number is greatly distant from the point issue number issued immediately before by the same module, there is the possibility of misuse.

As a result of the check of the point issue number of step 905, if the number is judged to be normal, next the number of points is checked (step 906). This check of the number of points may be performed by, for instance, verifying that the number of points does not exceed some upper limit.

If as a result of the check of the number of points, the number of points is judged to be normal, next the current time is acquired (step 907), adjustment of the number of points is performed (step 908), the adjusted information is recorded in the point database 661 (step 909), and processing is terminated.

In step 901, if there is judged to be an abnormality in the user ID or password, or if, in step 902, there is judged to be an abnormality in the module code, or if, in step 904, there is judged to be an abnormality in the parity, or if, in step 905, there is judged to be an abnormality in the point issue number, or if, in step 906, there is judged to be an abnormality in the number of points, abnormal termination occurs.

Next, a fourth embodiment of this invention is explained.

Figure 15:
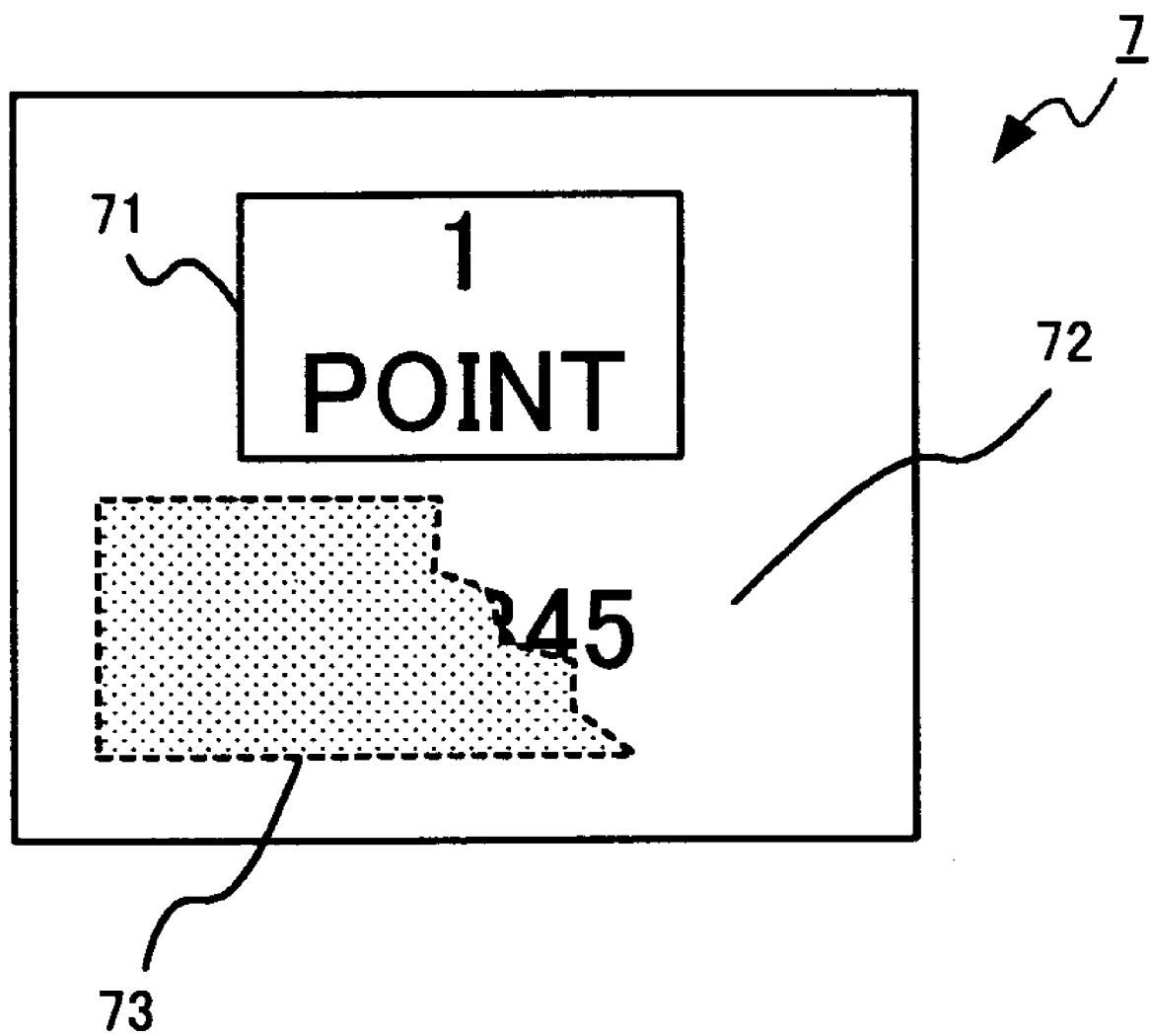
FIG. 15 is a diagram depicting one example of a point seal according to a fourth embodiment of this invention.
Figure 16:
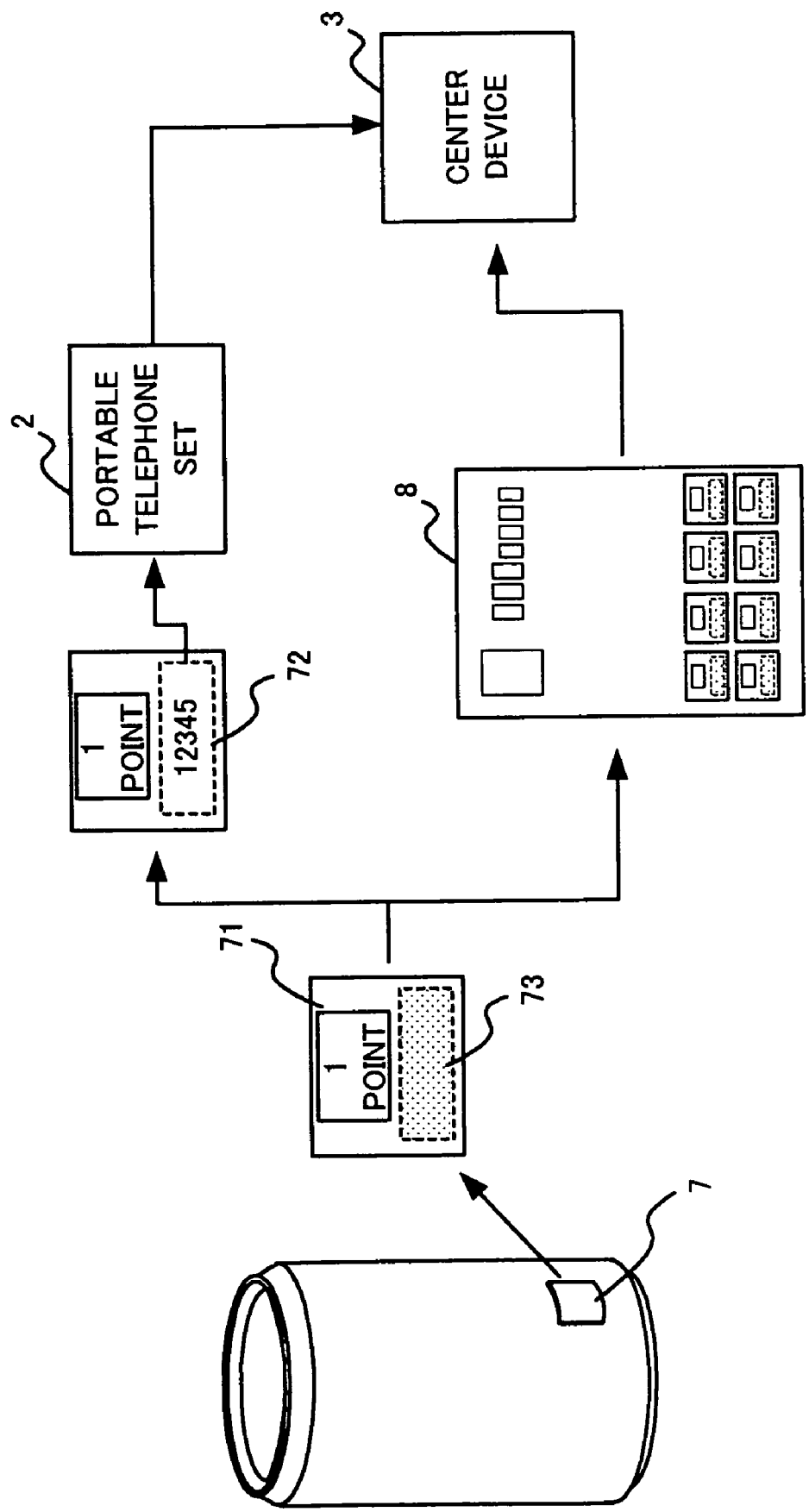
FIG. 16 is a diagram showing in summary the configuration of the promotion system in the fourth embodiment of this invention.

FIG. 15 is a diagram depicting one example of a point seal used in a fourth embodiment of this invention, and FIG. 16 is a diagram showing in summary the configuration of the promotion system in this fourth embodiment.

In FIG. 15, points 71 appropriate to the merchandise and point information 72 generated in relation to the points 71 are printed on the point seal 7; the point information 72 is covered with scratch-off ink 73, such that it is not easily seen by the purchaser.

As shown in FIG. 16, the purchaser either collects point seals 7 for more than a prescribed number of points, affixes them to a prescribed base 8 and mails them to the center device 3, or else the purchaser removes the scratch-off ink 73 from the point seal 7 to acquire the point information 72, and uses a portable telephone set 2 to transmit this point information 72 to the center device 3 to accumulate points and receive a service corresponding to the points accumulated.

However, when point seals 7 are mailed to the center device 3, any point seals 7 with the scratch-off ink removed are processed as invalid.

Hence if the purchaser wishes to transmit the points 72 to the center device 3 using a portable telephone set 2, the scratch-off ink must be removed; but even if point seals 7 with the scratch-off ink 73 removed are mailed, they are processed as invalid, and so it is possible to reliably prevent the duplicate use of point information 72 both by transmission using communication equipment and by mailing point seals 7.

In addition to the portable telephone set 2, point information can also be transmitted using a personal computer or other communication equipment.

What is claimed is:

1. A method for promoting the sale of merchandise and services through an automatic vending machine, comprising the sequential steps of:

1) presenting, by a point issuing device in the automatic vending machine, point information determined by the automatic vending machine, the point information related to points issued for promotion of sale merchandise to a user at a time of merchandise sales to the user by the automatic vending machine;

2) transmitting to a center device, by operation by the user of a portable communication device carried by the user, the point information determined and presented by the point issuing device in the point information presenting step, together with identification information for the user;

3) receiving at the center device the point information transmitted from the portable communication device of the user in the point information transmitting step and the identification information for the user;

4) totaling and managing at the center device points corresponding to the point information received in the receiving step for the user; and, offering the merchandise and services to the user through the automatic vending machine by referring to the points totaled and managed in the totaling and managing step and relating the points to the merchandise and services, wherein:

the point information includes a module code for identifying the automatic vending machine and a secret code related to the points, and the point information presenting step includes the step of encrypting by the point issuing device at least the secret code among the module code and the secret code before presentation of the point information to the user.

2. The promotion method according to claim 1, wherein the point information presenting step comprises the steps of:
effectively setting a display unit of the point issuing device based on a return signal issued by operation of a return lever of the automatic vending machine;
setting a timer for counting a predetermined time based on the return signal;
displaying on a display unit of the point issuing device the point information based on a money collecting signal for confirming that the sales of merchandise was performed by the automatic vending machine; and
erasing the display of the point information on the display unit of the point issuing device based on when the return signal is reissued by re-operation of the return lever or when the timer times out.

3. The promotion method according to claim 1, wherein the point information presenting step comprises the step of presenting the point information to the user by printing out the point information on a prescribed form from the point issuing device.

4. The promotion method according to claim 1, wherein the point information presenting step comprises the step of presenting the point information to the user by inputting the point information to the portable terminal carried by the user, by means of communication between the point issuing device and the portable terminal.

5. The promotion method according to claim 4, wherein the portable terminal comprises a portable telephone set carried by the user, and
input of the point information to the portable terminal is performed using any of wire communication, wireless communication, infrared communication, and audio communication between the point issuing device and the portable telephone set.

6. The promotion method according to claims 1, 2, 3, 4, or 5, wherein
the secret code comprises parity information for checking alteration of the point information.

7. The promotion method according to claims 1, 2, 3, 4, or 5, wherein the secret code comprises at least a point issue number unique to the issued point information, and
the center device judges duplicate use of the point information based on the point issue number.

8. The promotion method according to claim 1, wherein the center device manages a state of at least one of the point issuing device and the automatic vending machine in which the point issuing device is provided, based on the module code.

9. The promotion method according to claim 1, wherein the center device manages a status of use of the system by the user based on identification information for the user transmitted from the portable terminal of the user.

10. The promotion method according to claim 1, wherein the center device permits the user to read point information stored and managed for the user in response to a request from the user using the portable terminal.

11. A system for promoting the sale of products and services through an automatic vending machine, comprising:
a point issuing device, in the automatic vending machine configured to present to a user of the automatic vending machine coded point information related to points issued for promotion of sale of products and services upon sale of merchandise by the automatic vending machine;
a center device configured to store and manage points corresponding to the coded point information presented by the point issuing device, by the user;
a personal communications device carried by the user configured to transmit, by the operation of the personal communications device by the user, to the center device the coded point information presented by the point issuing device, together with identification of the user;
update means, provided in the center device, for decoding the coded point information transmitted by the portable terminal, and for updating points which have been stored and managed for the user based on the points corresponding to the decoded point information; and
premium providing means for offering a premium to the user by the automatic vending machine based on the points which have been stored and managed for the user, wherein:
the point information includes a module code configured to identify the automatic vending machine, and a secret code related to the points; and
whereby, the point issuing device encrypts at least the secret code before presenting the point information and products and services to the user.

12. The promotion system according to claim 11, wherein the point issuing device comprises:
setting means for effectively setting a display unit of the point issuing device based on a return signal issued by operation of a return lever of the automatic vending machine;
a timer configured to count a predetermined time based on the return signal;
display control means for displaying on the display unit of the point issuing device the point information on a condition that a money collecting signal for confirming that the sales of merchandises as performed by the automatic vending machine is issued, after the display unit of the point issuing device has been effectively set by the setting means; and
erase control means for erasing the display of the point information displayed on the display unit of the point issuing device based on when the return signal is reissued by re-operation of the return lever or when the timer times out.

13. The promotion system according to claim 11, wherein the point issuing device configured to resent the point information to the user by means of printing out the point information on a prescribed form by the use of printing means provided in the point issuing device.

14. The promotion system according to claim 11, wherein the point issuing device comprises input means for inputting the point information to the portable terminal through a communication between the point issuing device and the portable terminal.

15. The promotion system according to claim 14, wherein the portable terminal comprises a portable telephone set carried by the user, and
the input means configured to input the point information to the portable telephone set using any of wire communication, wireless communication, infrared communication, and audio communication.

16. The promotion system according to claims 11, 12, 13, 14, or 15, wherein the secret code comprises parity information for checking alteration of the point information.

17. The promotion system according to claims 11, 12, 13, 14, or 15, wherein
the secret code comprises at least a point issue number unique to the issued point information, and
the center device configured to detect duplicate use of the point information based on the point issue number comprised in the point information.

18. The promotion system according to claim 11, wherein
the center device comprises an equipment database configured to store and manage a state of at least one of the point issuing device and the automatic vending machine in which the point issuing device is provided, in correspondence with the module code.

19. The promotion system according to claim 11, wherein
the center device comprises a user database configured to store and manage circumstances of use of the system by the user, in correspondence with the identification information for the user transmitted from the portable terminal of the user.

20. The promotion system according to claim 11, wherein
the center device comprises accessing means which enables the user to access the point information stored and managed for the user, in response to a request made from the user using the portable terminal.

21. The promotion method according to claim 6, wherein
the secret code comprises at least a point issue number unique to the issued point information, and
the center device configured to judge duplicate use of the point information based on the point issue number.

22. The promotion system according to claim 16, wherein
the secret code comprises at least a point issue number unique to the issued point information, and
the center device configured to detect duplicate use of the point information based on the point issue number comprised in the point information.

* * * * *